(12) United States Patent  
Li et al.

(10) Patent No.: US 10,134,441 B2  
(45) Date of Patent: Nov. 20, 2018

(54) METHOD AND SYSTEM FOR OVERLAYING IMAGE IN VIDEO STREAM

(71) Applicant: BOE TECHNOLOGY GROUP CO., LTD., Beijing (CN)

(72) Inventors: Zhenglong Li, Beijing (CN); Xuewen Lv, Beijing (CN); Lijie Zhang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 96 days.

(21) Appl. No.: 15/122,539

(22) PCT Filed: Jan. 29, 2016

(86) PCT No.: PCT/CN2016/072735  
§ 371 (c)(1),  
(2) Date: Aug. 30, 2016

(87) PCT Pub. No.: WO2017/028502  
PCT Pub. Date: Feb. 23, 2017

(65) Prior Publication Data  
US 2017/0178686 A1 Jun. 22, 2017

(30) Foreign Application Priority Data  
Aug. 14, 2015 (CN) .......................... 2015 1 0501987

(51) Int. Cl.  
*G11B 27/00* (2006.01)  
*H04N 5/93* (2006.01)  
(Continued)

(52) U.S. Cl.  
CPC ..... *G11B 27/036* (2013.01); *H04N 21/23418* (2013.01); *H04N 21/23424* (2013.01);  
(Continued)

(58) Field of Classification Search  
USPC .................................................. 386/278–290  
See application file for complete search history.

(56) References Cited

U.S. PATENT DOCUMENTS 6,198,833 B1 * 3/2001 Rangan .................... G06K 9/32  
                                                      382/103  
8,752,085 B1     6/2014 Brueck et al.  
(Continued)

FOREIGN PATENT DOCUMENTS

CN     101365094 A     2/2009  
CN     102833625 A    12/2012  
(Continued)

OTHER PUBLICATIONS

First Office Action dated Sep. 1, 2017 in corresponding Chinese Patent Application No. 201510501987.X.  
(Continued)

*Primary Examiner* — Hung Dang  
(74) *Attorney, Agent, or Firm* — Nath, Goldberg & Meyer; Joshua B. Goldberg

(57) ABSTRACT

The present invention provides a method and a system for overlaying an image in a video stream. The method comprising steps of: acquiring an image element signature including at least one image element from the video stream; determining whether the image element signature matches an image to be overlaid; and overlaying the image when the image element signature is determined to match the image to be overlaid.

16 Claims, 2 Drawing Sheets

(51) Int. Cl.
*H04N 9/80* (2006.01)
*G11B 27/036* (2006.01)
*H04N 21/478* (2011.01)
*H04N 21/234* (2011.01)
*H04N 21/81* (2011.01)
*H04N 21/84* (2011.01)
*H04N 21/462* (2011.01)

(52) U.S. Cl.
CPC ....... *H04N 21/4622* (2013.01); *H04N 21/478* (2013.01); *H04N 21/812* (2013.01); *H04N 21/84* (2013.01); *H05K 999/99* (2013.01)

(56) References Cited

U.S. PATENT DOCUMENTS

| | | | |
|---|---|---|---|
| 2002/0013905 A1* | 1/2002 | Hamada | G06F 21/10 713/185 |
| 2011/0321086 A1 | 12/2011 | Buchheit et al. | |
| 2014/0237576 A1* | 8/2014 | Zhang | G06F 21/32 726/7 |

FOREIGN PATENT DOCUMENTS

| | | |
|---|---|---|
| CN | 103024480 A | 4/2013 |
| CN | 103297840 A | 9/2013 |
| CN | 103400284 A | 11/2013 |
| CN | 103929653 A | 7/2014 |
| CN | 104581430 A | 4/2015 |
| CN | 105141987 A | 12/2015 |

OTHER PUBLICATIONS

Form PCT/ISA/210 issued in corresponding international application No. PCT/CN2016/072735 issued May 16, 2016.
Form PCT/ISA/220 issued in corresponding international application No. PCT/CN2016/072735 issued May 16, 2016.
Form PCT/ISA/237 issued in corresponding international application No. PCT/CN2016/072735 issued May 16, 2016.
Chinese office action dated Apr. 13, 2018 for corresponding application No. 201510501987.X with English translation attached.

* cited by examiner

METHOD AND SYSTEM FOR OVERLAYING IMAGE IN VIDEO STREAM

This is a National Phase Application filed under 35 U.S.C. 371 as a national stage of PCT/CN2016/072735 filed on Jan. 29, 2016, an application claiming the benefit of Chinese Application No. 201510501987.X filed on Aug. 14, 2015, the content of each of which is hereby incorporated by reference in its entirety.

FIELD OF THE INVENTION

The present invention relates to the field of display technology, and particularly, relates to a method and a system for overlaying an image in a video stream.

BACKGROUND

With the progress of the society and the diversification of products, there is increasing demand for overlaying an image in a video stream (e.g., advertising push by using video). In the existing technologies, mostly, an image is overlaid into a video stream based on manual operations, i.e., an operator extracts, from the video stream, image frames that are appropriate for overlaying images, and then overlays the image in these extracted image frames by using an editing system.

The inventor has studied current image overlaying techniques, and found that the process of overlaying an image includes operations based on nonlinear video editing system and other non-automatic operations.

The operations based pm nonlinear video editing system include: determining, by an operator, a start video frame appropriate for overlaying an image; and editing the extracted video frame according to a template to complete the image overlay; Alternatively, selecting, by an audience, a video frame appropriate for overlaying an image; and performing three-dimensional fusion on the video frame selected by the audience and the image to be overlaid by using a tracking technique, so as to complete the image overlay. The operating process depends on manual selection and edit of video frames, and is thus difficult.

Other non-automatic operations include: storing, in information sequences, information of moving focus independently with respect to the video; determining, by a server, a corresponding information sequence according to video fingerprint transmitted from a client; overlaying, by the client, an images into a local playing video stream according to the information sequence, so as to complete the image overlay; alternatively, identifying an media object appropriate for overlaying an image by employing an identification unit having a scheduled rule; and overlaying the image to the identified media object by employing an integration unit.

In addition, in Video In technique of the internet company IQiYi, advertising information is added to a video stream through post processing, to achieve image overlay.

The above image overlaying techniques have the defects in common as follows: a lot of manual operations are required, image overlay cannot be achieved for mass videos timely and accurately, and response cannot be given promptly in the case that customer demand changes rapidly.

SUMMARY

In view of the above-described defects in the prior art, the technical problem to be resolved by the present invention is to provide a method and a system for overlaying an image in a video stream. The method can achieve the following effects: 1) overlaying an image in a photorealistic manner using strong restrictive conditions without influencing audience's video-viewing; 2) providing an interactive mode based on the analysis result of the video contents, such that the audience can select his/her favorite item, and search for goods; 3) analyzing preferences of the audience based on audience's video-viewing history, and overlaying an image pertinently and proactively; 4) capturing related information of image contents through specific algorithm optimization, so as to make the image overlaying effect more vivid and natural.

In general, automation of the image overlay is achieved, and image overlaying effect is improved.

According to an aspect of the present invention, there is provided a method for overlaying an image in a video stream, comprising steps of: acquiring an image element signature including at least one image element from the video stream; determining whether the image element signature matches an image to be overlaid; and overlaying the image when it is determined that the image element signature matches the image to be overlaid.

According to the embodiments of the present invention, the step of acquiring an image element signature from the video stream may comprise: extracting an image frame from the video stream to be played; performing pattern recognition on a picture of the extracted image frame; and generating the image element signature based on a result of the pattern recognition.

According to the embodiments of the present invention, the image frame is extracted from every a predetermined number of image frames in the video stream to be played.

According to the embodiments of the present invention, the step of performing pattern recognition on a picture of the extracted image frame may comprise: decomposing an extracted image frame into a plurality of sub-pictures at different scales; detecting an object label and a probability value of the image element included in each of the sub-pictures at different scales, and recording an approximate position of the detected image element. In addition, the step of generating an image element signature based on a result of the pattern recognition may comprise: synthesizing the detected image elements in the respective sub-pictures at different scales on the scale of the original image frame, to generate the image element signature corresponding to the extracted image frame.

According to the embodiments of the present invention, the extracted image frame may be decomposed into a plurality of sub-pictures at different scales by using Gaussian pyramid or Laplacian pyramid.

According to the embodiments of the present invention, the sub-pictures at different scales may be traversed by using sliding windows having a same dimension, to acquire the image elements in the respective sub-pictures at different scales.

According to the embodiments of the present invention, each of the sub-pictures at different scales may be respectively divided into a plurality of sub-images, and each sub-image is traversed by using the sliding window, to acquire the image elements in the respective sub-pictures at different scales.

According to the embodiments of the present invention, the step of generating an image element signature based on a result of the pattern recognition may further comprise: using the image elements having maximum probability values to synthesize the image element signature.

According to the embodiments of the present invention, the method for overlaying an image in a video stream may further comprise a step of: dynamically positioning the image element in the image element signature by tracking in subsequent image frames.

According to the embodiments of the present invention, the method for overlaying an image in a video stream may further comprise a step of: creating, in advance, a database of images to be overlaid including a collection of images to be overlaid.

According to the embodiments of the present invention, the step of determining whether the image element signature matches the image to be overlaid may comprise: comparing the image element signature with each of the images to be overlaid in the database of images to be overlaid, wherein at least category, shape, dimension and/or relative position relationship of the image element included in the image element signature are compared with those of the image to be overlaid.

According to the embodiments of the present invention, after determining that the image element signature matches the image to be overlaid and before overlaying the image, the method may further comprise a step of: performing a fine contour extraction on the image element in the image element signature and relevant surrounding objects thereof.

According to the embodiments of the present invention, the image to be overlaid may be an advertising primitive, and the image may be overlaid in the following manner: superimposing and displaying image and text or purchase link of the advertising primitive on an area of the image element in the image frame that matches the advertising primitive. Alternatively or additionally, the image may be overlaid in the following manner: replacing a picture of an object in the image frame that matches the advertising primitive with a picture of an object of the advertising primitive; and/or replacing a logo of the object with a logo of the object of the advertising primitive.

According to the embodiments of the present invention, the image to be overlaid may be an advertising primitive, and before determining whether the image element signature matches the image to be overlaid, the method may further comprise a step of: acquiring and analyzing audience viewing history of video streams to determine audience type, and determining type of the advertising primitive based on the determined audience type.

According to the embodiments of the present invention, the image element may include an object, a scenes or a character displayed in the image frame.

According to another aspect of the present invention, there is provided a system for overlaying an image into a video stream, comprising an image element signature generating unit, a matching unit and an overlaying unit. The image element signature generating unit is used for acquiring an image element signature including at least one image element from the video stream. The matching unit is used for determining whether the image element signature matches the image to be overlaid. The overlaying unit overlays the image when the matching unit determines that the image element signature matches the image to be overlaid.

According to the embodiments of the present invention, the image element signature generating unit may include an extracting sub-unit and a generating sub-unit. The extracting sub-unit is used for extracting the image frame from the video stream to be played. The generating sub-unit is used for performing pattern recognition on a picture of the extracted image frame, and generating the image element signature based on a result of the pattern recognition.

According to the embodiments of the present invention, the extracting sub-unit may extract the image frame from every a predetermined number of image frames in the video stream to be played.

According to the embodiments of the present invention, generating sub-unit may comprise an image frame decomposing module, an image element detecting module and an image element synthesizing module. The image frame decomposing module is used for decomposing the extracted image frame into a plurality of sub-pictures at different scales. The image element detecting module includes a plurality of detect units corresponding to the sub-pictures at different scales for detecting an object label and a probability value of the image element included in each of the sub-pictures at different scales, and recording an approximate position of the detected image element. The image element synthesizing module is used for synthesizing the detected image elements in the respective sub-pictures at different scale on the scale of the original image frame, to generate the image element signature corresponding to the extracted image frame.

According to the embodiments of the present invention, the image frame decomposing module may decompose the extracted image frame into a plurality of sub-pictures at different scales by using Gaussian pyramid or Laplacian pyramid.

According to the embodiments of the present invention, the image elements detecting module may employ sliding windows having a same dimension to traverse the sub-pictures at different scales, to acquire the image elements in the respective sub-pictures at different scales.

According to the embodiments of the present invention, each of the sub-pictures at different scales may be respectively divided into a plurality of sub-images, and each sub-image is traversed by using the sliding window, to acquire the image elements in the respective sub-pictures at different scales.

According to the embodiments of the present invention, the image element synthesizing module may employ the image elements having maximum probability values to synthesize the image element signature.

According to the embodiments of the present invention, the system for overlaying an image in a video stream may further include a database of images to be overlaid including a collection of images to be overlaid.

According to the embodiments of the present invention, the matching unit may compare the image element signature with each of the images to be overlaid in the database of images to be overlaid, wherein at least category, shape, dimension and/or relative position relationship of the image element included in the image element signature are compared with those of the image to be overlaid.

According to the embodiments of the present invention, the image element synthesizing module may include a labeling unit for performing a fine contour extraction on the image element in the image element signature and relevant surrounding objects thereof.

According to the embodiments of the present invention, the image to be overlaid may be an advertising primitive, and the overlaying unit may overlay the image in the following manner: superimposing and displaying image and text or purchase link of the advertising primitive on an area of the image element in the image frame that matches the advertising primitive. Alternatively or additionally, the overlaying unit may overlay the image in the following manner: replacing a picture of an object in the image frame that matches the advertising primitive with a picture of an object of the advertising primitive; and/or replacing a logo of the object with a logo of the object of the advertising primitive.

BRIEF DESCRIPTION OF THE DRAWINGS

To describe the technical solutions of embodiments of the present invention more clearly, various embodiments of the present invention will now be described in detail below in conjunction with the accompanying drawings. It should be recognized that the following description is only provided for explaining the embodiments of the present invention, rather than limiting the scope of the present invention. For those skilled in the art, various variations and modifications may be made to the various embodiments without departing from the scope of the present invention. In the figures.

DETAILED DESCRIPTION OF THE EMBODIMENTS

To provide better understanding of the technical solution of the present invention for those skilled in the art, a method and a system for overlaying an image in a video stream provided by the present invention will be described in detail below in conjunction with the accompanying drawings and the specific implementations.

Figure 1:
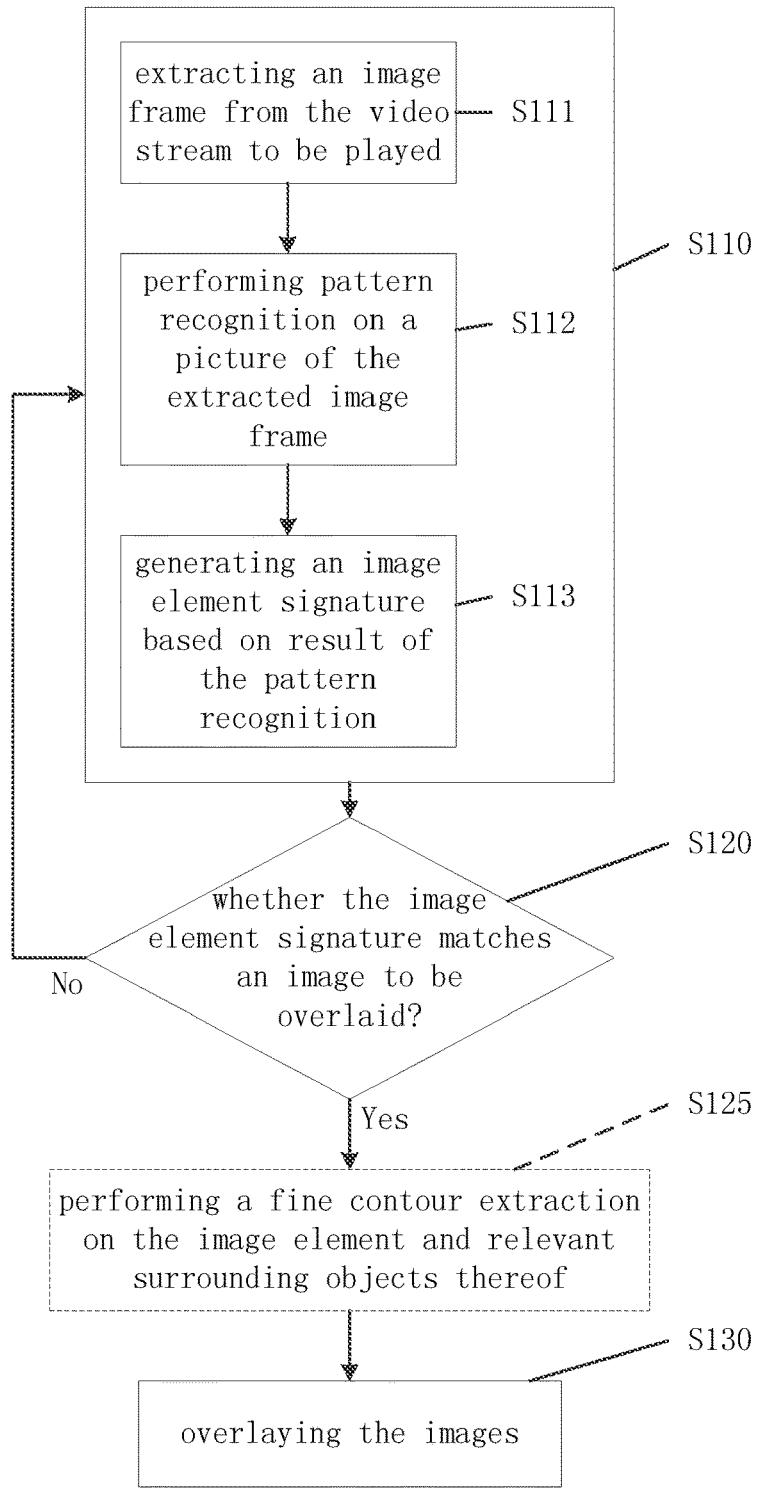
FIG. 1 is a flowchart of a method for overlaying an image according to an embodiment of the present invention.

FIG. 1 is a flowchart of a method for overlaying an image according to embodiments of the present invention.

As shown in FIG. 1, the method for overlaying an image according to the embodiments of the present invention includes:

acquiring an image element signature of at least one image element from a video stream (S110);

determining whether the image element signature matches an image to be overlaid (S120); and overlaying the image when the image element signature is determined to match the image to be overlaid (S130).

The image element described herein may include an object, a scene or a character displayed in an image frame. The image element signature may be used to determine, in the video stream, an image element that can be used for an image overlaying operation, so as to facilitate image overlay performed on the image element in a subsequent operation.

Referring to FIG. 1, the step of acquiring an image element signature from the video stream (S110) may include: extracting an image frame from the video stream to be played (S111); performing pattern recognition on a picture of the extracted image frame (S112); and generating an image element signature based on a result of the pattern recognition (S113).

Specifically, when extracting the image frames from the video stream, it is unnecessary to extract every frame in the video stream for analysis. The image frames may be extracted in such a manner that an image frame is extracted from every a predetermined number of image frames (e.g., 10 frames), so as to reduce the computational load. It could be easily understood that a frequency for extracting the image frames may be flexibly selected according to resolution of displayed images, processing speed of a processing system and density of overlaid images, and is not limited herein.

Figure 2:
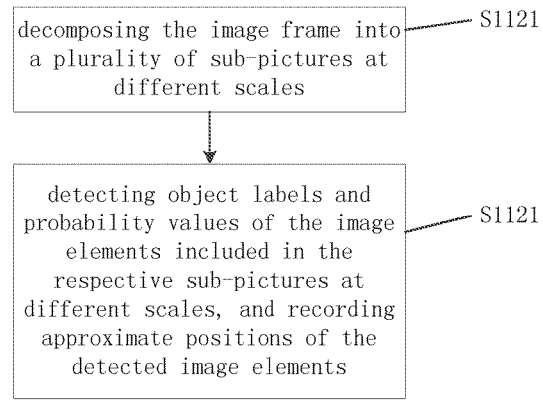
FIG. 2 is a flowchart of the step of performing pattern recognition on a picture of an extracted image frame in the method for overlaying an image according to an embodiment of the present invention.

FIG. 2 is a flowchart of the step of performing pattern recognition on a picture of the extracted image frame (S112) in the method for overlaying an image according to the embodiments of the present invention.

As shown in FIG. 2, according to the embodiments of the present invention, the steps of performing pattern recognition on the picture of the extracted image frame (S112) may include:

decomposing the extracted image frame into a plurality of sub-pictures at different scales (S1121); and detecting an object label and probability value of the image element included in each of the sub-pictures at different scales, and recording approximate position of the detected image element (S1122).

According to the embodiments of the present invention, the pattern recognition may be performed on the picture of the extracted image frame by using multi-scale detection and decomposition, for example, the extracted image frame may be decomposed into a plurality of sub-pictures at different scales by using Gaussian pyramid or Laplacian pyramid. Then, each of the sub-pictures at different scales is detected to find a possible image element included in the sub-picture, and probability value of the possibility is estimated. In addition, the approximate position of the detected possible image element is recorded.

According to the embodiment of the present invention, the step of generating an image element signature based on the result of the pattern recognition (S113) may include: synthesizing, on the scale of the original image frame, the image elements in the respective sub-pictures at different scales detected in the above-described manner, to generate an image element signature corresponding to the extracted image frame. Specifically, the image elements having maximum probability values may be used to synthesize the image element signature.

According to the embodiments of the present invention, each of the sub-pictures at different scales may be traversed by sliding windows having a same dimension, to acquire image elements in the respective sub-pictures at different scales. In this way, an objects, a scene or a characters that have different scales in the original image frame may be recognized. According to another embodiment of the present invention, each of the sub-pictures at different scales may be respectively divided into a plurality of sub-images, and each sub-image is traversed by the sliding window, so as to acquire image elements in the respective sub-pictures at different scales.

The image element signature synthesized in the above described manner may have the following two characteristics: comprising the image element that has the maximum probability value for successfully matching the image to be overlaid; and maintaining the same scale as the original image frame. Through a specific algorithm optimization, the captured image element is clearer, which can make the subsequent image overlaying effect more vivid and natural.

In order that the image overlay can be performed on a large amount of videos effectively and simultaneously, according to the embodiments of the present invention, a database of images to be overlaid may be created in advance and includes a collection of every image to be implanted. When determining whether or not the image element signature matches the image to be overlaid (step S120), the image element signature may be compared with each image to be overlaid in the database of images to be overlaid. The comparison includes comparing at least category, shape, dimension and/or relative position relationship of the image element included in the image element signature with those of the image to be overlaid.

When the comparison result indicates that the image element signature matches the image to be overlaid, the images is overlaid (step S130); otherwise, a new image element signature may be acquired from other image frame in the video stream, and the subsequent steps may be performed.

Information such as the category, shape, dimension and relative position relationship of the detected image element may be acquired from the image element signature. The database of images to be overlaid is queried using the information, so as to find whether there is an image to be overlaid consistent with the scene of the image frame or not. If so, the image frame is marked, which further improves fidelity and naturalness of the image overlay.

According to the embodiment of the present invention, before overlaying the image, a fine contour extraction may be performed on the image element in the image element signature and relevant surrounding objects thereof. In this case, the fineness of the contour of the image element is higher than that of the previous image element that is compared with the images to be overlaid, which can further make the image overlaying effect more vivid and natural.

According to the embodiments of the present invention, the image to be overlaid may be an advertising primitive, and the image may be overlaid in the following manner: superimposing and displaying image and text or purchase link of the advertising primitive on an area of the image element in the image frame that matches the advertising primitive. Alternatively or additionally, the image may be overlaid in the following manner: replacing a picture of an object in the image frame that matches the advertising primitive with a picture of an object of the advertising primitive; and/or replacing a logo of the object with a logo of the object of the advertising primitive. Moreover, based on the above image overlaying, the overlaid object may be replaced; or an object, which does not exist, may be added to the scene; or the hue of the scene after the replacement may be adjusted.

According to the embodiments of the present invention, after image overlay on one image frame is completed, in subsequent image frames, the image element in the image element signature may be dynamic positioned by tracking, so as to fuse the image element in the video stream with overlaid image, thereby achieving a purpose of automatically overlaying an image.

According to the embodiments of the present invention, when the image to be overlaid may be an advertising primitive, before the step of determining whether the image element signature matches the image to be overlaid (S120), audience viewing history of video streams may be acquired and analyzed to determine audience type, and type of the advertising primitive is determined based on the determined audience type. Methods for determining audience type according to viewing history of videos have been available, and will not be described in detail herein.

In the method for overlaying an image according to the embodiments of the present invention, the image overlay may be performed on any dynamic or static image. For example, when a user browses images or webpages, a target image/webpage may be modified in real time/offline according to an analysis result of these static images, to overlay a needed image.

Figure 3:
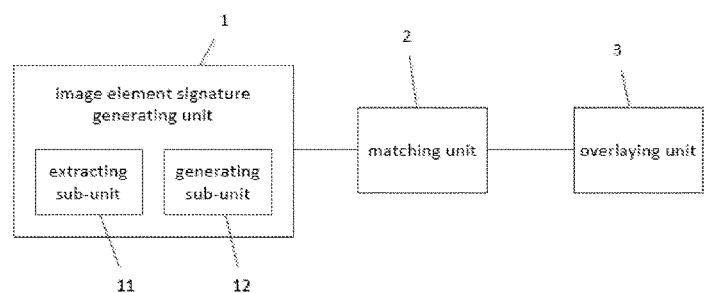
FIG. 3 is a schematic structure diagram of a system for overlaying an image according to an embodiment of the present invention.

FIG. 3 is a schematic structure diagram of a system for overlaying an image, according to the embodiments of the present invention.

As shown in FIG. 3, the system for overlaying an image according to the embodiments of the present invention may include an image element signature generating unit 1, a matching unit 2 and an overlaying unit 3. The image element signature generating unit 1 is used for acquiring an image element signature including at least one image element from a video stream. The matching unit 2 is used for determining whether the image element signature matches an image to be overlaid. When the matching unit 2 determines that the image element signature matches the image to be overlaid, the overlaying unit 3 overlays the image.

As shown in FIG. 3, according to the embodiments of the present invention, the image element signature generating unit 1 includes an extracting sub-unit 11 and a generating sub-unit 12. The extracting sub-unit 11 is used for extracting an image frame from the video stream to be played. For example, the extracting sub-unit 11 may extract image frames in such a manner that an image frame is extracted from every a predetermined number of image frames (e.g., 10 frames) to reduce the computational load. The generating sub-unit 12 is used for performing pattern recognition on a picture of the extracted image frame, and generating an image element signature based on a result of the pattern recognition.

Figure 4:
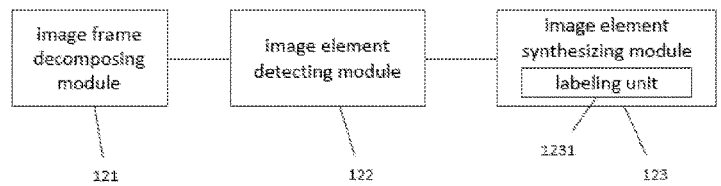
FIG. 4 is a schematic structure diagram of a generating sub-unit in an image element signature generating unit according to an embodiment of the present invention.

FIG. 4 is a schematic structure diagram of a generating sub-unit 12 in the image element signature generating unit according to the embodiments of the present invention.

As shown in FIG. 4, the generating sub-unit 12 may include an image frame decomposing module 121, an image element detecting module 122 and an image element synthesizing module 123. The image frame decomposing module 121 is used for decomposing the extracted image frame into a plurality of sub-pictures at different scales. For example, the image frame decomposing module 121 may decompose the extracted image frame into a plurality of sub-pictures at different scales by using Gaussian pyramid or Laplacian pyramid. The image element detecting module 122 includes a plurality of detecting units corresponding to the sub-pictures at different scales for detecting an object label and a probability value of the image element included in each of the sub-pictures at different scales, and recording an approximate position of the detected image element. The image element synthesizing module 123 is used for synthesizing the detected image elements in the respective sub-pictures at different scales on the scale of the original image frame, to generate an image element signature corresponding to the extracted image frame.

According to the embodiments of the present invention, each detect unit of the image element detecting module 122 may employ a sliding window having a same dimension to traverse each of the sub-pictures at different scales, to acquire the image element in each of the sub-pictures at different scales. According to another embodiment of the present invention, each of the sub-pictures at different scales may be divided into a plurality of sub-images, and each sub-image may be traversed by using the sliding window, so as to acquire the image element in each of the sub-pictures at different scales.

According to the embodiments of the present invention, the image element synthesizing module 123 may employ the image elements having maximum probability values to synthesize the image element signature.

The system for overlaying an image according to the embodiments of the present invention may further include a database of images to be overlaid including a collection of images to be overlaid. The matching unit 2 may compare the image element signature with each image to be overlaid in the database of images to be overlaid, wherein at least category, shape, dimension and/or relative position relationship of the image element included in the image element signature are compared with those of the image to be overlaid. When the matching unit 2 determines that the image element signature matches the image to be overlaid, the overlaying unit 3 overlays the image; otherwise, the image element signature generating unit 1 acquires a new image element signature based on other image frames in the video stream, and determines whether the new image element signature matches the image to be overlaid.

According to the embodiments of the present invention, the image element synthesizing module 123 may include a labeling unit 1231, which is used for performing a fine contour extraction on the image element in the image element signature and the relevant surrounding objects thereof.

According to the embodiments of the present invention, the image to be overlaid may be an advertising primitive, and the overlaying unit 3 may overlay the image in the following manner: superimposing and displaying image and text or purchase link of the advertising primitive on an area of the image element in the image frame that matches the advertising primitive. Alternatively or additionally, the overlaying unit 3 may overlay the image in the following manner: replacing a picture of an object in the image frame that matches the advertising primitive with a picture of an object of the advertising primitive; and/or replacing a logo of the object with a logo of the object of the advertising primitive.

It could be understood that the above embodiments are exemplary embodiments used for describing the principle of the present invention only, but the present invention is not limited thereto. For those skilled in the art, various variations and modifications may be made without departing from the spirit and substance of the present invention, and these variations and modifications are considered as falling into the protection scope of the present invention.

The invention claimed is:

1. A method for overlaying an image in a video stream, comprising steps of:
   acquiring, from the video stream, an image element signature including at least one images element,
   determining whether the image element signature matches an image to be overlaid,
   overlaying the image when it is determined that the image element signature matches the image to be overlaid,
   wherein the step of acquiring from the video stream, the image element signature comprises:
   extracting an image frame from the video stream to be played,
   performing pattern recognition on a picture of the extracted image frame, and
   generating the image element signature based on a result of the pattern recognition,
   wherein the step of performing pattern recognition on a picture of the extracted image frame comprises:
   decomposing the extracted image frame into a plurality of sub-pictures at different scales detecting an object label and a probability value of the image element included in each of the sub-pictures at different scales, and recording an approximate position of the detected image element, and
   the step of generating an image element signature based on a result of the pattern recognition comprises:
   synthesizing the detected image elements in the respective sub-pictures at different scales on the scale of the original image frame, to generate the image element signature corresponding to the extracted image frame.

2. The method according to claim 1, wherein the extracting is performed at an interval of a predetermined number of image frames, from the video stream to be played.

3. The method according to claim 1, wherein the extracted image frame are decomposed into a plurality of sub-pictures at different scales by using Gaussian pyramid or Laplacian pyramid.

4. The method according to claim 1, wherein the sub-pictures at different scales are traversed by using sliding windows having a same dimension, to acquire the image elements in the respective sub-pictures at different scales.

5. The method according to claim 4, wherein each of the sub-pictures at different scales are respectively divided into a plurality of sub-images, and each sub-image is traversed by using the sliding window, to acquire the image elements in the respective sub-pictures at different scales.

6. The method according to claim 1, wherein the step of generating an image element signature based on a result of the pattern recognition further comprises:
   using the image elements having maximum probability values to synthesize the image element signature.

7. The method according to claim 1, further comprising the step of:
   creating, in advance, a database of images to be overlaid including a collection of images to be overlaid, and
   wherein the step of determining whether the image element signature matches an image to be overlaid comprises:
   comparing the image element signature with each image to be overlaid in the database of images to be overlaid, wherein at least category, shape, dimension and/or relative position relationship of the image element included in the image element signature are compared with those of the image to be overlaid.

8. The method according to claim 1, wherein after determining that the image element signature matches the image to be overlaid and before overlaying the image, the method further comprises a step of:
   performing a fine contour extraction on the image element in the image element signature and relevant surrounding objects thereof.

9. A system for overlaying an image into a video stream, comprising an image element signature generating unit, a matching unit and an overlaying unit, wherein:
   an image element signature generating unit is used for acquiring, from the video stream, an image element signature including at least one image element,
   the matching unit is used for determining whether the image element signature matches the image to be overlaid, and
   the overlaying unit overlays the image when the matching unit determines that the image element signature matches the image to be overlaid,
   wherein the image element signature generating unit includes an extracting sub-unit and a venerating sub-unit, wherein the extracting sub-unit is used for extracting an image frame from the video stream to be played and the generating sub-unit is sued for performing pattern recognition on a picture of the extracted image frame, and for generating the image element signature based on a result of the pattern recognition, wherein the generating sub-unit comprises an image frame decomposing module, an image element detecting module and an image element synthesizing module, wherein the image frame decomposing module is used for decomposing the extracted image frame into a plurality of sub-pictures at different scales, the image element detecting module includes a plurality of detect units corresponding to the sub-pictures at different scales for detecting object labels and probability values of the image elements included in the respective sub-pictures at different scales, and record approximate positions of the detected image elements, and the image element synthesizing module is used for synthesizing the detected image elements in the respective sub-pictures at different scales on the scale of the original image frame, to generate an image element signature corresponding to the extracted image frame.

10. The system according to claim 9, wherein the extracting sub-unit is used for extracting an image frame from every a predetermined number of image frames in the video stream to be played.

11. The system according to claim 9, wherein the image frame decomposing module decomposes the extracted image frame into a plurality of sub-pictures at different scales by using Gaussian pyramid or Laplacian pyramid.

12. The system according to claim 9, wherein each detect unit of the image elements detect module employing sliding windows having a same dimension to traverse each of the sub-pictures at different scales, to acquire image elements in each of the sub-pictures at different scales.

13. The system according to claim 12, wherein each of the sub-pictures at different scales are respectively divided into a plurality of sub-images, and each sub-image is traversed by using the sliding windows, to acquire the image elements in the respective sub-pictures at different scales.

14. The system according to claim 9, wherein the image element synthesizing module employs the image elements having maximum probability values to synthesize the image element signature.

15. The system according to claim 9, further comprising:
a database of images to be overlaid including a collection of images to be overlaid, and
wherein the matching unit compares the image element signature with each of the images to be overlaid in the database of images to be overlaid, wherein at least category, shape, dimension and/or relative position relationship of the image element included in the image element signature are compared with those of the image to be overlaid.

16. The system according to claim 9, wherein the image element synthesizing module includes a labeling unit for performing a fine contour extraction on the image element in the image element signature and relevant surrounding objects thereof.

* * * * *